No. 736,366. PATENTED AUG. 18, 1903.
J. C. CROMWELL & C. W. A. KOELKEBECK.
BELL GEAR FOR BLAST FURNACES.
APPLICATION FILED DEC. 11, 1902.
NO MODEL. 7 SHEETS—SHEET 1.
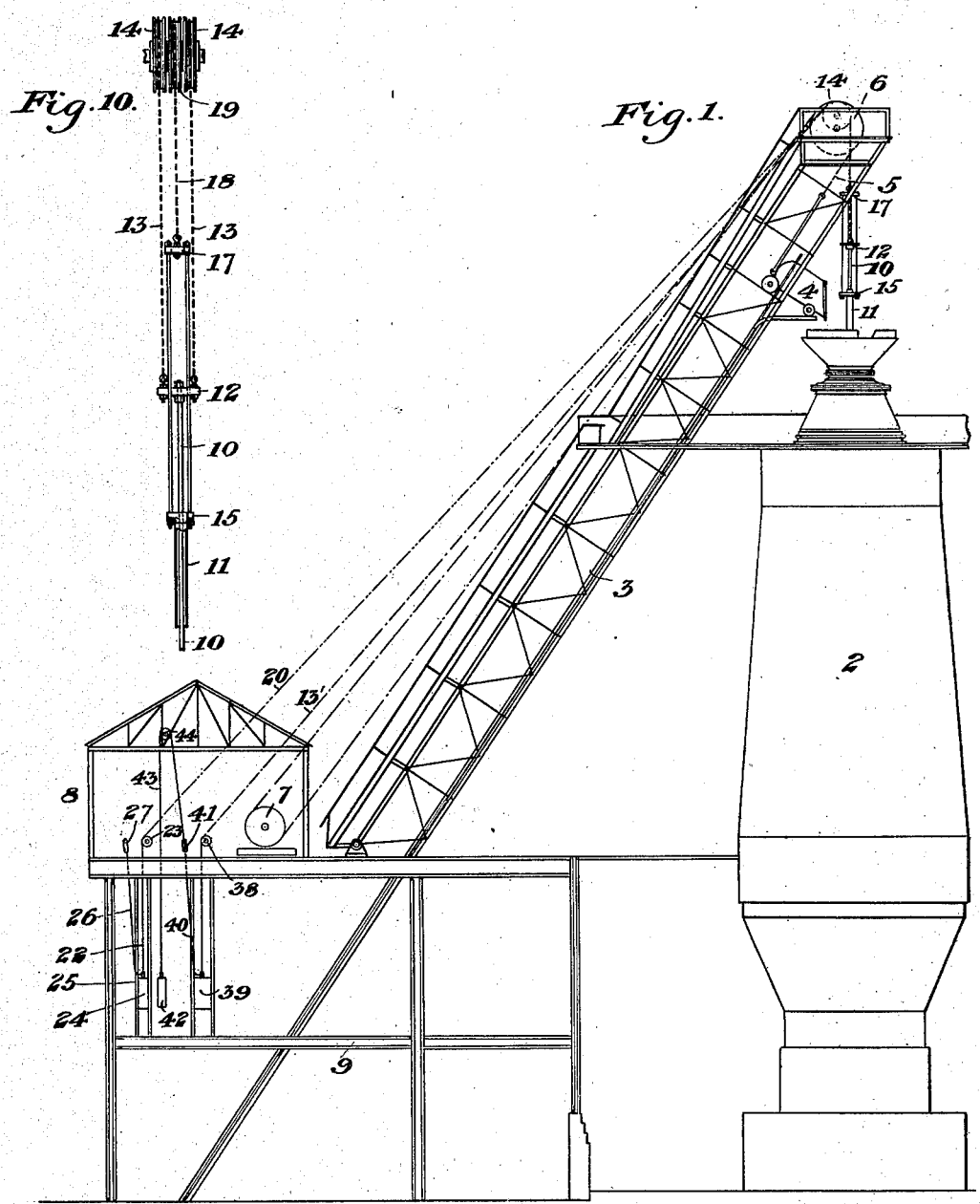
WITNESSES
INVENTORS
John C. Cromwell
C. W. A. Koelkebeck
by Bakewell & Byrnes
their attys No. 736,366. PATENTED AUG. 18, 1903.
J. C. CROMWELL & C. W. A. KOELKEBECK.
BELL GEAR FOR BLAST FURNACES.
APPLICATION FILED DEC. 11, 1902.
NO MODEL. 7 SHEETS—SHEET 2.
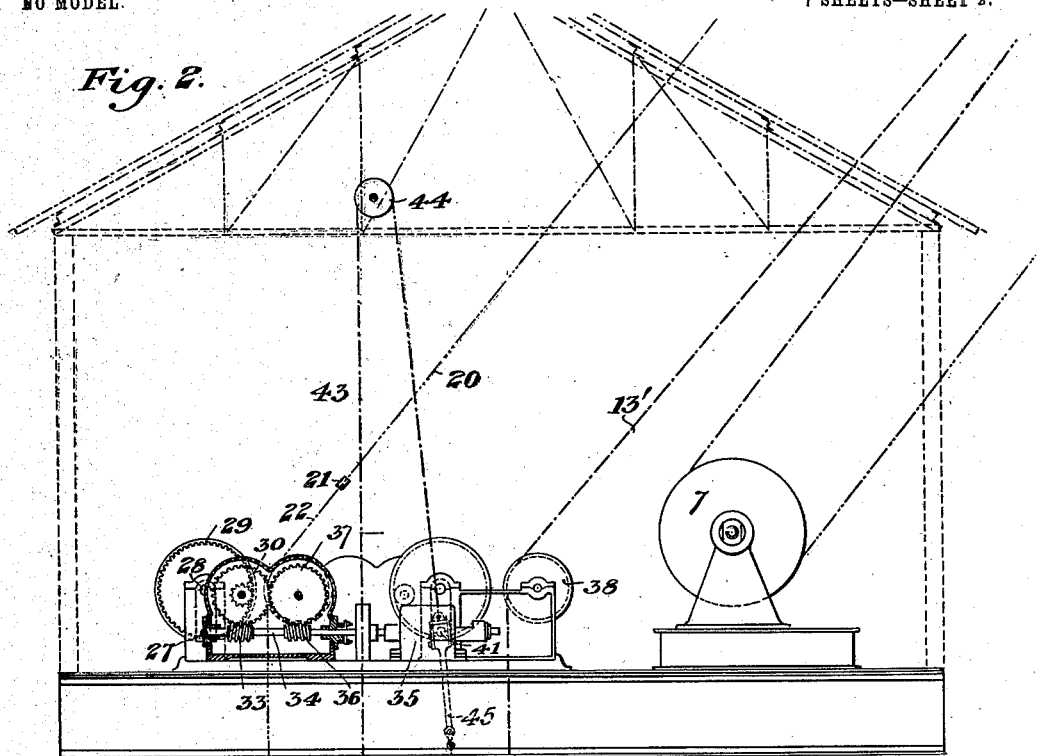
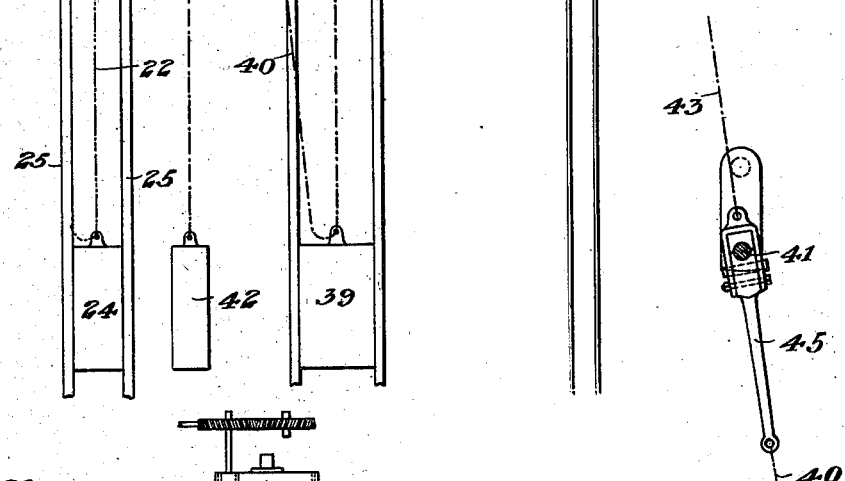
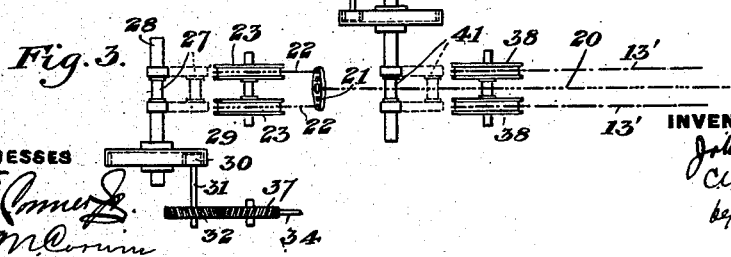
WITNESSES
INVENTORS No. 736,366. PATENTED AUG. 18, 1903.
J. C. CROMWELL & C. W. A. KOELKEBECK.
BELL GEAR FOR BLAST FURNACES.
APPLICATION FILED DEC. 11, 1902.
NO MODEL. 7 SHEETS—SHEET 3.
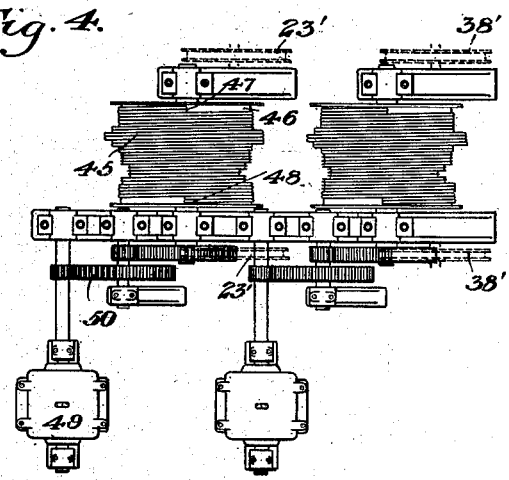
Fig. 4.
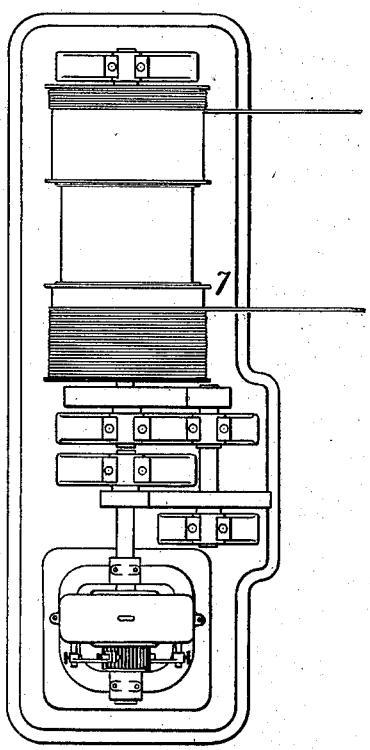
Fig. 5.
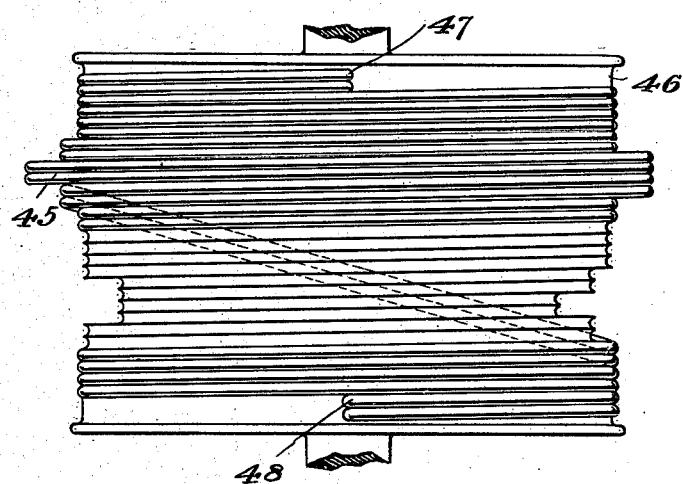
WITNESSES
INVENTORS
John C. Cromwell
C. W. A. Koelkebeck No. 736,366. PATENTED AUG. 18, 1903.
J. C. CROMWELL & C. W. A. KOELKEBECK.
BELL GEAR FOR BLAST FURNACES.
APPLICATION FILED DEC. 11, 1902.

NO MODEL. 7 SHEETS—SHEET 5.

WITNESSES
INVENTORS

No. 736,366. PATENTED AUG. 18, 1903.
J. C. CROMWELL & C. W. A. KOELKEBECK.
BELL GEAR FOR BLAST FURNACES.
APPLICATION FILED DEC. 11, 1902.
NO MODEL. 7 SHEETS—SHEET 6.

WITNESSES
INVENTORS

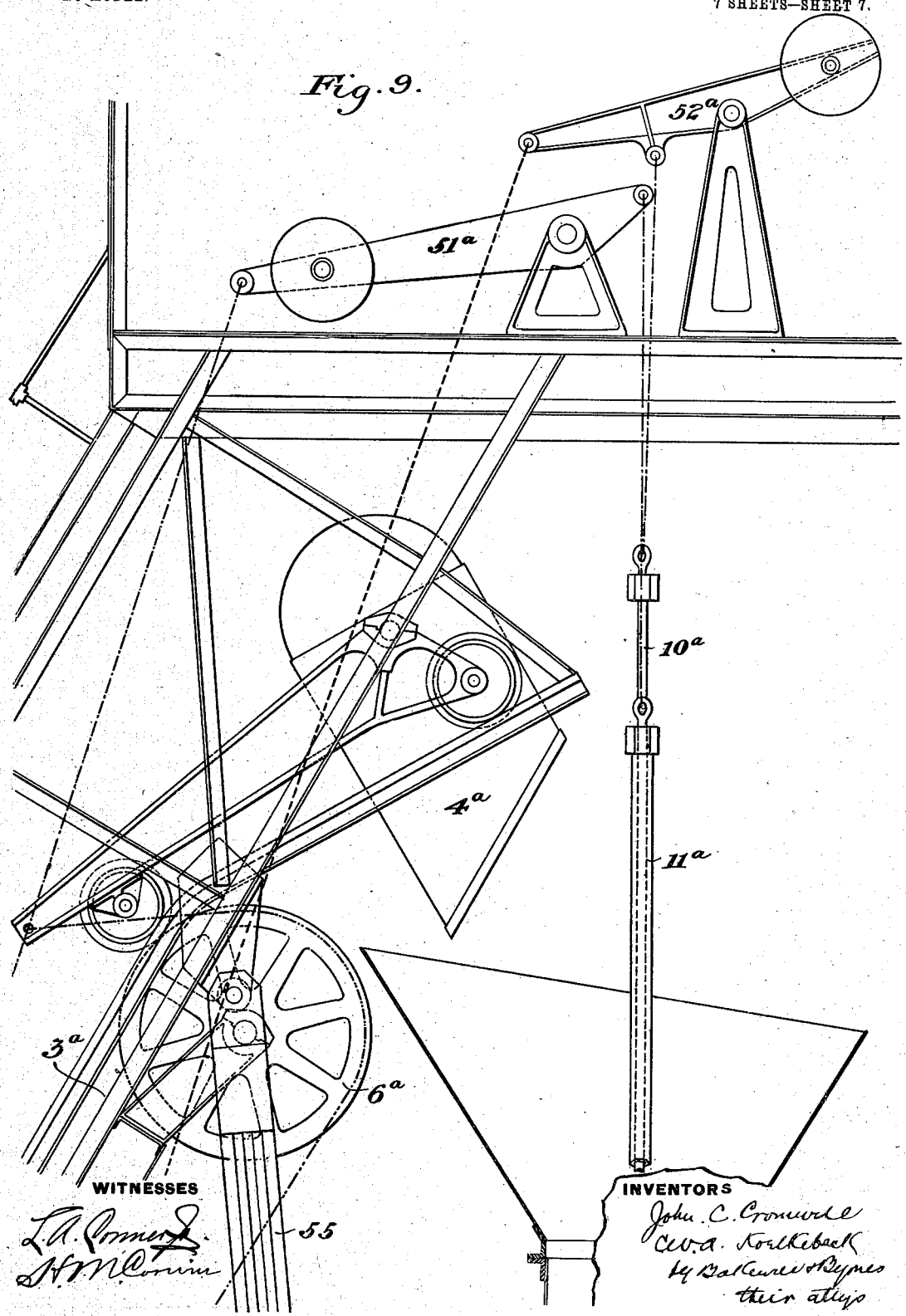

No. 736,366. Patented August 18, 1903.

UNITED STATES PATENT OFFICE.

JOHN C. CROMWELL AND CARL W. A. KOELKEBECK, OF CLEVELAND, OHIO.

BELL-GEAR FOR BLAST-FURNACES.

SPECIFICATION forming part of Letters Patent No. 736,366, dated August 18, 1903.

Application filed December 11, 1902. Serial No. 134,738. (No model.)

*To all whom it may concern:*

Be it known that we, JOHN C. CROMWELL and CARL W. A. KOELKEBECK, of Cleveland, Cuyahoga county, Ohio, have invented a new and useful Bell-Gear for Blast-Furnaces, of which the following is a full, clear, and exact description, reference being had to the accompanying drawings, forming part of this specification, in which—

Figure 6:
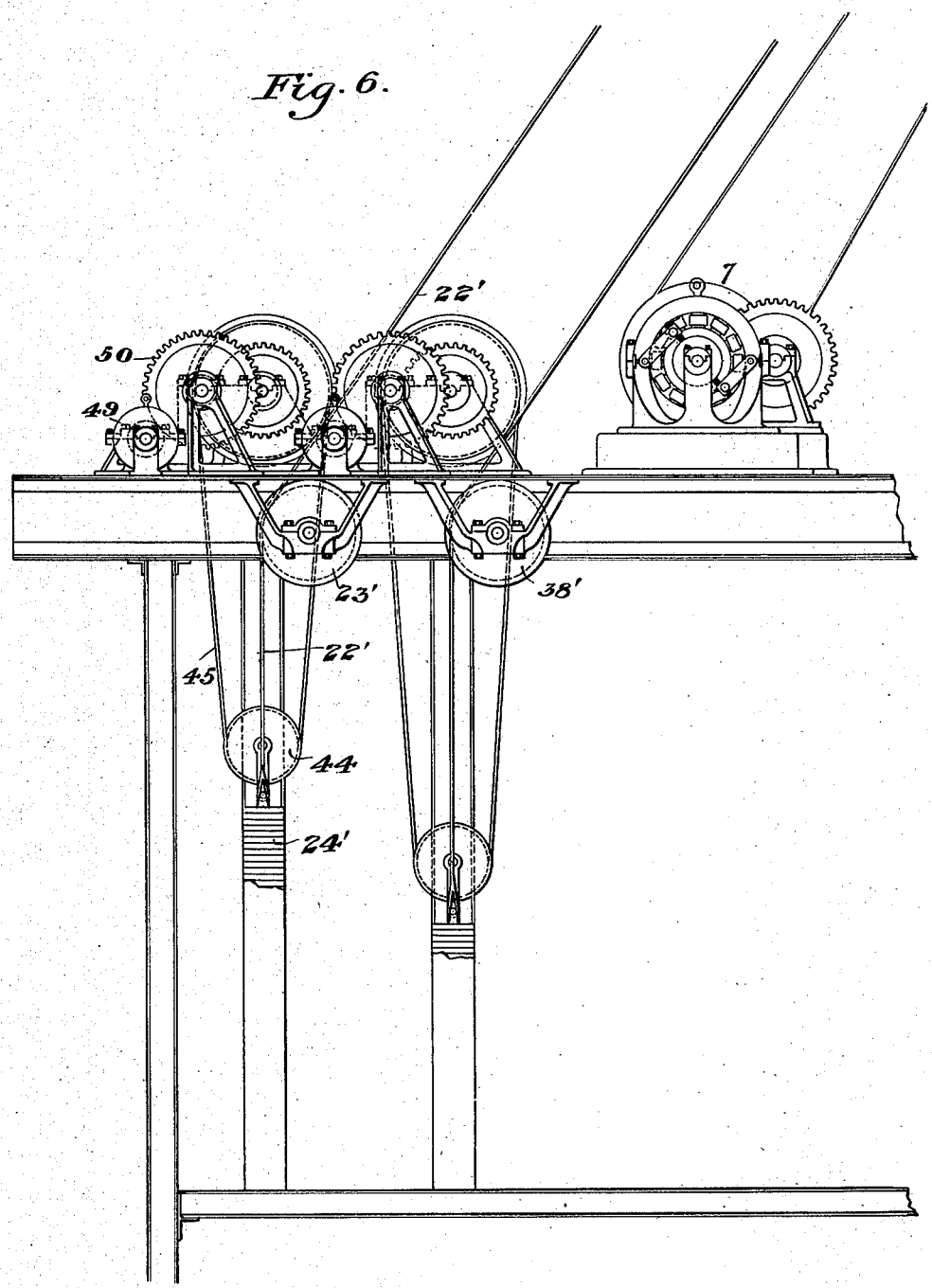
Figure 7:
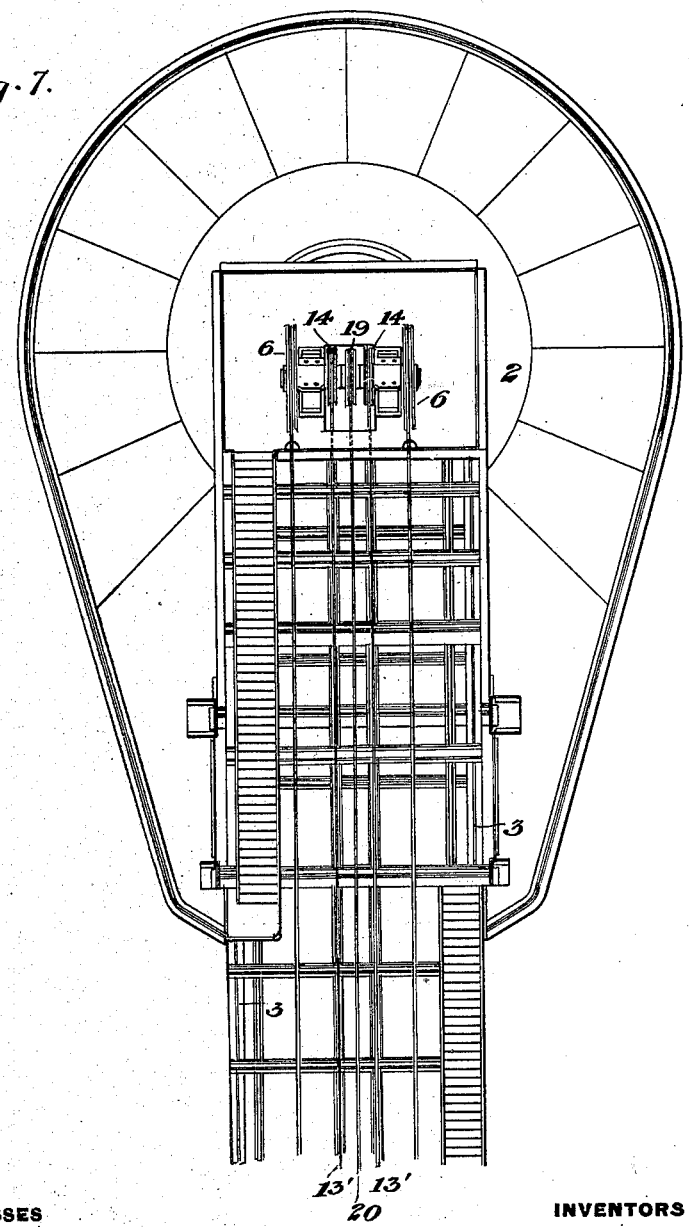
Figure 8:
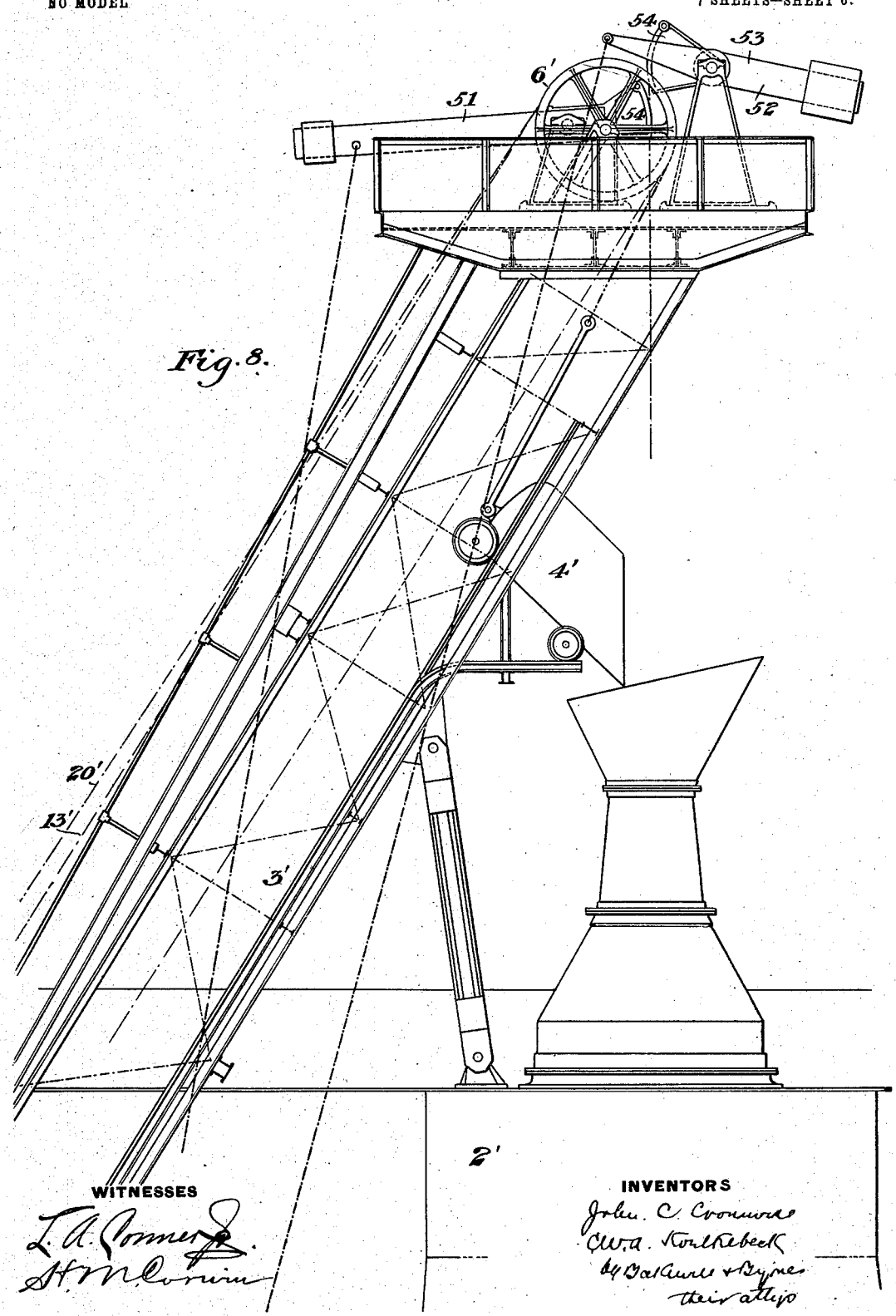

Figure 1 is a diagrammatic side elevation showing one form of our improved apparatus. Fig. 2 is an enlarged sectional side elevation of the motor-house. Fig. 3 is a diagrammatic top plan view of the crank mechanism. Fig. 4 is a top plan view showing a modified form of operating-gear in the form of winding-drums. Fig. 5 is an enlarged detail of one of the drums, showing the manner of winding. Fig. 6 is a partial side elevation showing the form of Figs. 4 and 5. Fig. 7 is a top plan view of the furnace-top mechanism of Fig. 1. Fig. 8 is an enlarged side elevation showing a modified form of the furnace-top mechanism; and Fig. 9 is a view similar to Fig. 8 with a modified arrangement of the sheave for the skip-hoist. Fig. 10 is a detail view of the sheave and hoisting connections for the bells, and Fig. 11 is a detail of the connecting-rod and crank for the operating-gear.

Our invention relates to the operating-gear for actuating the bells of blast-furnaces. It is designed to largely do away with the top work of the furnace-stack, to remove all motors from the furnace top, and to provide simple and effective mechanism in the engine or motor house which will act upon flexible connections leading to the bells and operate them in the desired manner.

It further consists in providing counterweights in connection with the cables or flexible connections leading to, or near to, the yard-level, which counterweights will act to seat the bells when released, and, further, to provide against shocks and injury owing to sudden seating of the bell.

In the drawings, referring to the forms of Figs. 1 to 3, we show a blast-furnace 2, having the usual inclined bridge 3 leading to its top and supporting the track for the skip-car 4. The cable 5 for this skip-car extends to and up around an upper sheave and thence down to a winding-drum 7 in the motor-house 8. We have shown this motor-house as elevated above the yard-level upon a structure 9, but it may be located at any desired level, such as at the ground-level.

The bell-operating rod 10 for the lower main bell extends upwardly through the tubular rod 11 for the upper bell to a cross-head 12. Two wire ropes 13 are secured to the ends of the cross-head and extend up over two sheaves 14 upon a common shaft at the upper end of the bridge and thence down to the motor-house. The tubular rod 11 for the upper bell is provided at its upper end with a cross-head 15 at an angle to the cross-head 12 and connected by two rods 16 with an upper and similar cross-head 17. A chain 18 is centrally secured to the cross-head 17 and extends upwardly over a chain-wheel 19, located between and on the same shaft as the chain-wheels 14 for the two chains of the main bell. The chain 18 is secured to a wire rope 20, which in this form extends to a cross-head 21, having two chains 22, which lead over chain-wheels 23 and downwardly to a counterweight 24, to which they are secured. The counterweight 24 slides vertically within guides 25 and is heavier than the bell and the charge combined. This counterweight will therefore seat the upper bell and hold it seated whenever it is allowed to act, and to lower the bell I lift the counterweight by connecting to the weight 24 a lifting-chain 26, which leads up to a crank 27, projecting from a shaft 28. I have shown this shaft as provided with an internal gear-wheel 29, with which engages a pinion 30, whose shaft 31 is provided with a worm-wheel 32, engaging a worm 33 on the shaft 34, which is driven by electric motor 35. Another worm 36 upon this shaft engages another worm-wheel 37, the two providing an equalizing-gear to neutralize the end thrust on the worm-shaft. When the upper bell is seated, the crank 27 is in a vertical position, projecting downwardly. When it is desired to dump the charge, the operator starts the motor 35 and thus turns the crank from its depending vertical position into successive angular positions, thus lifting the counterweight and allowing the load of the charge to force the bell down and discharge it. The movement of this crank is comparatively slow and is timed, so that in one revolution of it the stock will be discharged before the bell is again lifted to its seat by the counterweight. It should be noted that the first portion of the movement of the crank is an idle movement, which takes up the slack in the connecting-chain, and owing to the changing angularity of the crank as the crank in the last quarter of its stroke moves from a horizontal down into a vertical position the movement of the bell will be slowed up, allowing it to seat without sudden jar under the action of the counterweight.

The ropes 13′ for the main bell extend down to and over chain-wheels 38 and down to a counterweight 39, which is similar to the counterweight 34, but larger, and is heavier than the weight of the main bell and its charge. This weight is lifted by chain connection 40 with a crank 41, which is operated by gearing similar to that already described for the other crank.

In order to reduce the amount of power required in lifting the weight which closes the main bell, we provide a weight 42, hung upon a chain 43, which extends over an upper pulley 44 and thence down to a connecting-rod 45 on the crank, to which it is secured. When the bell is closed, the movement of the crank is stopped by an electric cut-out and brake, and the crank is then in a down position in line with the cord 43 in the portion on this side of the upper wheel. The weight 42 therefore exerts no influence in attempting to turn the crank, and hence the bell remains seated. When the crank begins to turn, however, the weight 42 at once begins to exert a lift upon the crank, which thus assists in lifting the weight 39 and lowering the bell, while on the latter half of the stroke the crank lifts the weight 42 and allows the weight 39 to close the bell. We prefer to use this assisting weight in the case of a large bell on account of the amount of power that would otherwise be required. During the last quarter of the stroke as the weight 39 nears the lower end of its travel the bell will seat, and the weight will then travel a slight amount, owing to the stretch of the rope, but it will then come to rest. After this the further travel of the crank puts a slack in the operating-chain while completing its one revolution and bringing it again into line with the chain 43.

Instead of using the crank system, which we prefer on account of its simplicity and the ease of varying the speed, we may use differential winding-drums, as shown in Figs. 4, 5, and 6. In these figures, 23′ are the chain-wheels for the cable of the upper bell and 38′ those for the lower and main bell. The chains 22′ pass over these wheels and down to the weight 24′. A sheave 44 is connected to the weight, and around it pass wire ropes 45, which are wound around a differential drum 46, their ends being secured at opposite sides of this drum at 47 and 48. This drum is differential, and the helical grooves for the cables increase and decrease in diameter in a peculiar relation. The purpose of this is to decrease the speed at the moment of closing the bell and also at the beginning of lifting the weight to open the bell. On turning the drum the amount of lift of the weight will depend upon the difference between the lift of the bights on one side and the lowering of those on the other, this depending on the difference of the radii of the grooves at any particular point, and this difference is therefore varied, so that at the start and near the end of travel the movement will be slow to give a slow movement in the start of the opening and in the seating of the bell. We have shown the drum as actuated by an electric motor 49, having slow-motion gearing 50 connected with the drum. As the drum revolves in one direction, say five or six revolutions, it will lower and then raise the bell with a slow motion at the ends of the stroke. On the reverse movement of the drum the same movements are again imparted to the bell as before.

In Fig. 8 we show the operating-cables 13′ for the main bell, and 20′ for the upper bell extending upwardly from the motor-house to levers 51 and 52, which are mounted at the upper end of the bridge in bearings 53. Each of these levers is provided with a segmental portion 54, to which the chains for the bells are secured, the bell and cross-head connections being substantially the same as before. In this form I show the sheave 6′ for the skip-hoist as located at the top of the bridge.

In Fig. 9 we show a form substantially similar to that of Fig. 8, similar parts being marked with similar numerals, with $a$ applied thereto, except that the sheave 6$^a$ for the skip-hoist is located below the upper end of the track and upon the pivotal links 55, which connect the bridge to the top of the furnace. The weighted levers 51$^a$ and 52$^a$ are also slightly modified as to their form and chain connection. In these forms of Figs. 8 and 9 the operating mechanism in the motor-house may be the same as above described, the actuating connections operating the top levers and thereby the bells in the same manner as though connected continuously and directly to the bells.

The advantages of our invention result from the doing away with all motors at the top of the furnace, from the clearing away of a large amount of framing at the furnace top, and from the simplicity and effectiveness of the hoist connections. The use of the counterweights greatly reduces the power required, while means are provided for slowing down the movement and closing the bell to prevent injury to the bell or hopper.

Many changes may be made in the form and arrangement of the hoppers and bells, the actuating connections, and the operating mechanism in the engine or motor house without departing from our invention.

We claim—

1. A furnace having a movable closing bell, a counterweight arranged to hold the bell closed, and an operating connection extending from the furnace top down to a convenient level and having actuating mechanism arranged to lift the counterweight; substantially as described.

2. A furnace having a hopper and bell, an operating-cable for the bell extending from the furnace top downwardly, and connected to a counterweight, and mechanism at or near the ground-level arranged to lift the counterweight; substantially as described.

3. A furnace having a hopper and bell, an operating-cable for the bell extending from the furnace top down to a convenient level, and actuating mechanism for the cable arranged to slow down its movement as the bell is seated; substantially as described.

4. A furnace having a hopper and bell, an operating-cable for the bell extending from the furnace top down to a convenient level and connected to a counterweight, and mechanism arranged to lift the counterweight, said mechanism being arranged to give a slower movement as the bell is closed; substantially as described.

5. A furnace having a hopper and bell, an operating-cable for the bell extending down to a convenient level, and a crank device arranged to actuate the cable and change the speed of motion of the bell; substantially as described.

6. A furnace having a hopper and bell, an operating-cable for the bell extending from the furnace top down to a convenient level, a crank device arranged to actuate the cable and change the speed of motion of the bell, and a counterweight arranged to normally hold the bell closed; substantially as described.

7. A furnace having an upper and a lower bell, operating connections for said bells extending down to a convenient level, counterweights connected to the cables, and mechanism for lifting the counterweights to lower the bells; substantially as described.

8. A blast-furnace having upper and lower hoppers, closing bells therefor, a shaft having three pulleys or wheels, two flexible connections leading over the outer two wheels and connected to one bell, and a flexible connection leading over the center wheel and arranged to actuate the other bell; substantially as described.

9. A blast-furnace having upper and lower hoppers, closing bells therefor, a shaft at the upper end of the bridge over the top of the furnace having three pulleys or wheels with a common axis, two flexible connections leading over the outer wheels and connected to the lower main bell, and a flexible connection leading over the middle wheel and connected to the upper bell; substantially as described.

10. A furnace having a bell and hopper, an operating-cable connected to a counterweight, lifting mechanism connected to the counterweight and another weight arranged to act in opposition to the counterweight and assist the lifting mechanism; substantially as described.

11. A furnace having a bell and hopper, an operating-cable for the bell connected to a counterweight, crank mechanism connected with the counterweight and arranged to lift it, and another weight arranged to act in opposition to the counterweight, said other weight exerting a pull substantially in line with the crank when the bell is closed; substantially as described.

12. A furnace having a bell and hopper, an operating connection for the bell extending from the furnace top down to a convenient level, a counterweight connected to said connection, and having greater weight than the bell and its load, and mechanism for lifting the weight; substantially as described.

13. A blast-furnace having a plurality of hoppers and bells, an inclined bridge leading to its top, wheels supported at the upper end of the bridge, operating-cables connected to the bells and extending over the wheels and down to a convenient level, and operating mechanism for said cables; substantially as described.

In testimony whereof we have hereunto set our hands.

JOHN C. CROMWELL.
C. W. A. KOELKEBECK.

Witnesses:
H. D. SMITH,
JOHN G. SHARP.